United States Patent [19]

Creasey et al.

[11] 3,941,856

[45] Mar. 2, 1976

[54] SURFACE TREATING COMPOSITIONS

[75] Inventors: Norman Geoffrey Creasey; Leslie Clark Pike, both of Manchester, England

[73] Assignee: Imperial Chemical Industries Limited, London, England

[22] Filed: Jan. 29, 1974

[21] Appl. No.: 437,665

[30] Foreign Application Priority Data
Jan. 30, 1973 United Kingdom............... 4584/73
July 5, 1973 United Kingdom............. 31984/73

[52] U.S. Cl...... 260/825; 260/32.6 R; 260/33.2 SB; 260/33.45 B; 260/33.6 SB; 260/46.5 G; 260/46.5 H; 428/380; 428/391; 428/393; 428/394; 428/395

[51] Int. Cl.²........................................ C08L 83/04

[58] Field of Search.......... 260/825, 46.5 H, 32.6 R, 260/33.2 SB, 33.4 SB, 33.6 SB; 428/380, 391

[56] References Cited

UNITED STATES PATENTS

| | | | |
|---|---|---|---|
| 3,524,900 | 8/1970 | Gibbon et al. | 260/825 |
| 3,527,728 | 9/1970 | Gibbon et al. | 260/825 |
| 3,565,838 | 2/1971 | Atkinson et al. | 260/825 |
| 3,849,359 | 11/1974 | Nitzsche et al. | 260/825 |

*Primary Examiner*—Wilbert J. Briggs, Sr.
*Attorney, Agent, or Firm*—Cushman, Darby & Cushman

[57] ABSTRACT

Compositions for surface treatments to give lower release values comprising 100 parts by weight of a hydroxy-containing diorganopolysiloxane, 1 to 20 parts by weight of an organohydrogenpolysiloxane, 0.05 to less than 20 parts by weight of an aminoalkoxy silicon compound, 1 to 20 parts by weight of an organotin compound and, if desired, up to 10 parts by weight of a non-amino-containing alkoxy silicon compound.

18 Claims, No Drawings

SURFACE TREATING COMPOSITIONS

This invention relates to new and useful surface-treating compositions and more particularly to such compositions based on organopolysiloxanes.

A wide variety of compositions suitable for use in surface treatments of materials such as woven, felted or knitted fabrics of natural or synthetic fibres and which are based on organopolysiloxanes are known and are readily available. For some of these applications, including the treatment of paper, it is desirable that the compositions used should have a rapid rate of cure at not too high a temperature and should be resistant to removal by abrasion immediately after curing. While many compositions are available which give a rapid cure, the hitherto available compositions, especially when applied to paper, have had little resistance to removal by abrasion immediately after curing although such resistance has in some cases developed later. These disadvantages have, however, been overcome by the compositions described and claimed in our British Patents Nos. 1,152,251 and 1,240,511. British Patent No. 1,152,251 describes and claims improved compositions comprising 100 parts by weight of a diorganopolysiloxane having at least 2 hydroxyl groups attached to different silicon atoms per molecule and of viscosity not less than 3000 cs. at 25°C, 1 to 20 parts by weight of a mono-organohydrogenpolysiloxane of viscosity not greater than 1000 cs. at 25°C, 1 to 20 parts by weight of an aminoalkoxy silicon compound as defined therein and 5 to 20 parts by weight of an organotin acylate in an organic solvent. British Patent No. 1,240,511, which is a patent of addition to 1,152,251, describes and claims improved compositions comprising 100 parts by weight of a diorganopolysiloxane having at least two hydroxyl groups attached to different silicon atoms per molecule and of viscosity not less than 3000 cs. at 25°C, 1 to 20 parts by weight of an organohydrogenpolysiloxane of viscosity not greater than 1000 cs. at 25°C and containing at least one silicon-bonded hydrogen atom for every three silicon atoms, 1 to 20 parts by weight of an aminoalkoxy silicon compound and 5 to 20 parts by weight of a tin compound of the general formula $YO(R_2SnO)_nY$ where R is an alkyl group having not more than 20 carbon atoms, Y is $R'R''C=N-$ or $R'''$ where $R'$ is a hydrocarbyl group or hydrogen and $R''$ and $R'''$ are hydrocarbyl groups and $n$ is 1, 2, 3 or 4 in an organic solvent. Because of developments in equipment and techniques, however, a requirement has arisen for compositions which give coated papers having very low release values and which give ready release even from agressive adhesives. We have now found that compositions having the desired properties can be obtained by modification of the proportions of the constituents of the compositions of the said patents. Thus the present invention is an improvement in or modification of that described and claimed in our British Patent No. 1,152,251.

According to the present invention new compositions for use in surface treatment to give lower release values than have hitherto been obtainable comprise 100 parts by weight of a diorganopolysiloxane having at least two hydroxyl groups attached to different silicon atoms per molecule and of viscosity not less than 3000 cs. at 25°C, 1 to 20 parts by weight of an organohydrogenpolysiloxane of viscosity not greater than 1000 cs. at 25°C and containing at least one silicon-bonded hydrogen atom for every three silicon atoms, 0.05 to less than 20 parts by weight for an aminoalkoxy silicon compound and 1 to 20 parts by weight of a tin compound in an organic solvent.

It is preferred in some cases, for example, when maximum ease of release is required, that the viscosity of the diorganopolysiloxane be not less than 500,000 cs. at 25°C. If there are present, as there may be, more than two hydroxyl groups per molecule, two or more of these may be attached to the same silicon atom always provided that there are at least two hydroxyl groups attached to different silicon atoms. It is also preferred that there be a hydroxyl group attached to each terminal silicon atom in the chain.

The diorganopolysiloxane while consisting essentially of diorganosiloxanyl units may also contain a small proportion of trifunctional silicon atoms attached to a single organo group provided the amount of such is not sufficient to destroy the solubility of the diorganopolysiloxane in the chosen organic solvent. The organo groups in the diorganopolysiloxane may be alkyl, aryl, aralkyl, alkaryl, alkenyl, cycloalkyl or cycloalkenyl groups or such groups containing a variety of substituents such as halogens or cyano groups. Suitable groups include, for example, methyl, ethyl, phenyl, vinyl, cyclohexyl, 3,3,3-trifluoropropyl and chlorophenyl groups. In many cases it is preferred that at least the major proportion and, in some cases, all, of the organo groups, are methyl groups.

The organohydrogenpolysiloxane is normally preferably used in amount not less than 3 parts by weight. It may be a linear or cyclic mono-organopolysiloxane or a mixture of both and may, if desired, also contain a proportion, preferably not more than a minor proportion, of diorganosiloxanyl units, but should contain at least one silicon-bonded hydrogen atom for every three silicon atoms. If linear it may be terminated by, for example, triorganosilyl groups.

The organo groups in the organohydrogenpolysiloxane may be alkyl, aryl, aralkyl, alkaryl, alkenyl, cycloalkyl or cycloalkenyl groups. Suitable groups which may be used include, for example, methyl, ethyl, phenyl, tolyl, benzyl and vinyl groups. Preferred siloxanes are those consisting of methylhydrogensiloxanyl units terminated by trimethylsilyl groups.

While the aminoalkoxy-silicon compound may be in amount from 0.05 to less than 20 parts by weight per 100 parts by weight of diorganopolysiloxane it is preferably used in amount from 0.05 to 1.0 part. The aminoalkoxy-silicon compound may be any silicon compound having one or more of the groups $(R^4R^5N.R^8-)$ attached to one or more silicon atoms through an oxygen atom, where $R^8$ is an alkylene group or consists of alkylene groups joined by one or more $-NR^6-$ groups or oxygen atoms and the oxygen atom attached to silicon and the essential nitrogen atom being attached to different carbon atoms and $R^4$ and $R^5$, which may or may not be the same, are hydrogen or alkyl, cycloalkyl, aminoalkyl or hydroxy-alkyl groups, monovalent groups consisting of alkylene and alkyl groups joined by one or more $-NR^5-$ groups or oxygen atoms or alternatively $R^4$ and $R^5$ together form a single alkylene group or a group consisting of alkylene groups joined by one or more $-NR^6-$ groups or oxygen atoms and $R^6$ is hydrogen or an alkyl group having not more than 5 carbon atoms. It is preferred that $R^8$ be $-CH_2CH_2-$ or $-CH_2CH(Et)-$ and that $R^4$ and $R^5$ be hydrogen or methyl or ethyl groups. Because of low cost and availability the more generally preferred group is $NH_2CH_2CH_2-$.

Suitable groups which may be attached to a silicon atom through an oxygen atom to form aminoalkoxy silicon compounds include, for example, $-CH_2CH_2NH_2$,
$-CH_2CH_2NH.CH_3$,
$-CH_2CH_2N(CH_3)_2$,
$-CH_2CH_2N(C_2H_5)_2$,
$-CH_2CH_2CH_2NH_2$,
$-CH_2CH(CH_3)NH_2$,
$-CH(CH_3)CH_2NH_2$,

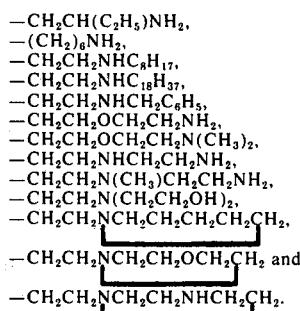

$-CH_2CH(C_2H_5)NH_2$,
$-(CH_2)_6NH_2$,
$-CH_2CH_2NHC_8H_{17}$,
$-CH_2CH_2NHC_{18}H_{37}$,
$-CH_2CH_2NHCH_2C_6H_5$,
$-CH_2CH_2OCH_2CH_2NH_2$,
$-CH_2CH_2OCH_2CH_2N(CH_3)_2$,
$-CH_2CH_2NHCH_2CH_2NH_2$,
$-CH_2CH_2N(CH_3)CH_2CH_2NH_2$,
$-CH_2CH_2N(CH_2CH_2OH)_2$,
$-CH_2CH_2NCH_2CH_2CH_2CH_2$,
$-CH_2CH_2NCH_2CH_2OCH_2CH_2$ and
$-CH_2CH_2NCH_2CH_2NHCH_2CH_2$.

The aminoalkoxy silicon compound may be, for example, an aminoalkoxy silane, an aminoalkoxydisilane, an amino-alkylsilicate, an amino-alkyl polysilicate, an amino-alkoxy organopolysiloxane, an amino-alkoxy silphenylene or an amino-alkoxysilmethylene. Suitable compounds include, for example, $MeSi(O.CH_2CH_2NH_2)_3$;
$Me_2Si(OCH_2CH_2NMe_2)_2$;
$Me_3SiO.CH_2CH_2NH_2$;
$PhSi(OCH_2CH[Et]NH_2)_3$;
$(EtNH.CH_2CH_2O)_3Si.CH_2Si(O.CH_2CH_2NHEt)_3$;
$(H_2N.CH_2CH_2O)_3Si.CH_2CH_2Si)O.CH_2CH_2NH_2)_3$;
$(H_2N.CH_2CH_2O)_3Si.C_6H_4.Si(OCH_2CH_2NH_2)_3$;
$CH_2=CH.Si(O.CH_2CH_2OCH_2CH_2NH_2)_3$;
$(H_2N.CH_2CH_2O)_2SiMe.SiMe(OCH_2CH_2NH_2)_2$;
$H_2N.CH_2CH_2OSi.Me_2.SiMe(O.CH_2CH_2NH_2)_2$;
$Si(O.CH_2CH_2NH_2)_4$;
$(MeSi\ O.CH_2CH_2.NH.CHCH_2CH_2CH_2CH_2CH\ O)_4$;
$C_{14}H_{29}Si(O.CH_2NH_2)_3$
$Me_3SiO(SiMe[\ O.CH_2CH_2NH_2]O)_{50}SiMe_3$;
$(H_2N.CH_2CH_2O.SiMe_2)_2O$;
$Me_3SiO(SiMe[O.CH_2CH_2NH_2]O)_{40}(SiMe_2O)_{5-8}SiMe_3$;
$Me_3SiO(SiMe[O.CH_2CH_2NH_2]O)_{25-}(SiMe[OBu]O)_{25}SiMe_3$;
$Me_3SiO(SiMe\ [OCH_2CH_2NH_2]O)_5(SiMe[OMe]O)_{4-5}SiMe_3$;
$Me_3SiO(SiMe[OCH_2CH_2NH_2]O)_{45}(SiMe[OCH_2CH_2OCH_3]O)_5SiMe_3$ and $Me_3SiO(SiMe[OCH_2CH_2NMe_2]O)_{25-}(SiMe[OMe]O)_{25}(SiMe_2O)_{50}SiMe_3$ The preferred aminoalkoxysilicon compounds are those of average general formula $R_a{}^7(R^4R^5NR^6O)_bSiO$ where $R^7$ is a hydrocarbyl or hydrocarbyloxy group, $R^8$, $R^4$ and $R^5$ are as defined above, $a$ is any number from 0 to 2, $b$ is any number from 0.1 to 4, $a+b$ is not greater than 4 and not less than 1.95, and the total number of carbon atoms in the groups $R^8$, $R^4$, $R^5$ and $R^7$ is not greater than 24. The group $R^7$ may be alkyl, aryl, aralkyl, alkaryl, alkenyl, alkoxy, aralkyloxy or such groups containing substituents. Suitable groups include, for example, methyl, ethyl, vinyl, phenyl, chlorophenyl, fluoropropyl, benzyl, tolyl, methoxy, ethoxy, butoxy and phenoxy groups.

A further preferred class of aminoalkoxy silicon compounds consists of the aminoethoxymethylpolysiloxanes, where $R^7$ is a methyl group, $a$ is 1.0 to 1.8, $b$ is 0.3 to 1.0 and $a+b$ is not less than 2.0.

A still further preferred class of aminoalkoxy silicon compounds consists of the mixed aminoethoxymethyl- and methoxymethylpolysiloxanes, where $R^7$ is a mixture of both methyl and methoxy groups. This class is exemplified by the average general formula;

$Me_c(H_2NC_2H_4O)_d(MeO)_eSiO$ where $c$ is 1.0 to 1.8, $d$ is 0.1 to 0.9, $e$ is 0.1 to 0.9 and $c+d+e$ is not less than 2.0.

The organotin catalyst may be used in amount from 1 to 20 parts by weight per 100 parts by weight of the diorganopolysiloxane. It is, however, in general preferred that it be used in amount from 1 to 10 parts by weight.

The catalyst may be an organotin acylate of the general formula:

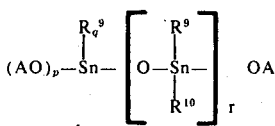

where A is an acyl group, $R^9$ and $R^{10}$, which may or may not be alike, are hydrocarbyl groups, preferably alkyl groups, $p$ is 1 or 2, $q$ is 1 or 2, $p+q$ equals 3 and $r$ is 0, 1 or 2. In many cases it is preferred to use a diorganotin diacylate and while the groups $R^9$ and $R^{10}$ are in general preferred to be alkyl groups, it is in many cases also preferred that they be butyl or octyl groups. It is also preferred that the acyl group A be aliphatic, for example, such as lauroyl, octoyl, 2-ethyl-n-hexoyl, butyroyl, propionyl, acetyl, or formyl group. In many cases it is preferred that the acyl groups have not more than five carbon atoms. Particular tin acylates preferred for many purposes include, dibutyltin diformate, dibuyltin diacetate, dibutyltin dipropionate, di-n-octyltin diformate, di-n-octyltin diacetate and di-n-octyltin dipropionate. The acylates which may be used also include the acyloxystannoxanes such as, for example, di-acetoxytetrabutyldistannoxane, diformoxy tetrabutyldistannoxane and diacetoxytetraoctyldistannoxane. These may be prepared by reacting the appropriate organotin oxide with a carboxylic acid and removing the water formed during the reaction. Other suitable tin acylates, include, for example, butyltin triacetate and n-octyltin triacetate.

Another class of catalyst is described by the general formula $YO(R_2SnO)_nY$ where R is an alkyl group having not more than 20 carbon atoms, Y is $R^1R^2C=N-$ or $R^3$ where $R^1$ is hydrogen or a hydrocarbyl group and $R^2$ and $R^3$ are hydrocarbyl groups and $n$ is 1, 2, 3 or 4. The group R may be, for example, methyl, ethyl, propyl, butyl, octyl, decyl, dodecyl, tetradecyl and octadecyl. It is however normally preferred that the group R be a butyl or an octyl group. The group $R^1$ when not hydrogen, and the groups $R^2$ and $R^3$ may be alkyl, aryl, aralkyl, alkaryl, cycloalkyl, alkenyl or cycloalkenyl groups. Suitable groups include, for example, methyl, ethyl, propyl, butyl, hexyl, cyclohexyl, phenyl, tolyl and benzyl groups. It is preferred that $R^1$ be hydrogen. It is also preferred that $R^3$ be a butyl or phenyl group.

There may also be present in our compositions an alkoxy silicon compound. This may be used in amount from 0 to 10.0 parts by weight per 100 parts by weight of the diorganopolysiloxane. Suitable alkoxy silicon compounds are of the general formula $R_g^{11}(R^{12}O)_f SiO$ where $R^{11}$ is a hydrocarbyl group, $R^{12}$ is a hydrocarbyl or $R^{11}OCH_2-$ or $R^{11}(OCHR^{13}CHR^{14})_m$ group where $R^{13}$ and $R^{14}$ are the same or different and may be hydrogen or an alkyl group such as methyl, ethyl, propyl or butyl, $m$ is 1 or 2, $g$ is any number from 0 to 2, $f$ is any number from 0.1 to 4, $g+f$ is not greater than 4 and not less than 1.95 and the total number of carbon atoms in the groups $R^{11}$ and $R^{12}$ is not greater than 24. The group $R^{11}$ may be an alkyl, aryl, aralkyl, alkaryl or alkenyl group or such a group containing substituents. Suitable groups include, for example, methyl, ethyl, vinyl, phenyl, chlorophenyl, fluoropropyl, benzyl and tolyl groups. $R^{12}$ may be an alkyl, aryl, aralkyl or alkoxyalkyl group or such a group containing substituents. Suitable groups include, for example, methyl, ethyl butyl, phenyl and methoxyethyl groups. Suitable compounds include, for example $MeSi(OEt)_3, Si(OEt)_4, MeSi(OCH_2OEt)_3, PhSi(OBu)_3,$
$Me_3SiO[Me(MeO)SiO]_{50}SiMe_3$
$Me_3SiO[Me(CH_3OC_2H_4O)SiO]_5SiMe_3$
$Me_3SiO[Me(EtO)SiO]_{30}[Me_2SiO]_{20}SiMe_3$
$Me_3SiO[Me(MeO)SiO]_{25}[Me(MeOC_2H_4O)SiO]_{2.5}SiMe_3$ and ethylpolysilicate.

In general the preferred alkoxysilicon compounds are the methylalkoxypolysiloxanes where $R^{11}$ is methyl, $R^{12}$ is methyl, ethyl or methoxyethyl, $g$ is 1.0 to 1.8, $f$ is 0.3 to 1.0 and $g+f$ is not less than 2.0.

The compositions can be cured to non-migratory adhesive films having greatly increased release properties by exposure to temperature of 150°C or higher, for a few seconds or to lower temperatures for longer periods, for example, some 15 seconds at 120°C or about 1 minute at 70°C. The temperature selected for curing will, of course, depend on the application for which the particular composition is being used and the speed of curing can be varied widely by varying the nature and proportions of the constituents. Thus these compositions can be used and are particularly valuable for use in processes such as paper treating which can be carried out continuously at high speeds, for example speeds of up to 500 ft./minute can be used where it is possible to give a dwell time of some 15–30 seconds in a heating zone at 110°–120°C.

The compositions can also be used to form adhesive films on a wide variety of other substrates, for example on polyolefin or polyester films such as polypropylene or polyethyleneterephthalate and on metals such as aluminum, glass and ceramics.

Our invention is further illustrated by the following Examples in which all parts and percentages are by weight.

EXAMPLE 1

Thirteen 50% solutions of aminoalkoxysiloxanes or alkoxysiloxanes in toluene or xylene were prepared from aminoalcohols, alcohols and methyl polysiloxanes as follows:

In solutions A to L inclusive a methylhydrogenpolysiloxane of formula $Me_3SiO(MeHSiO)_{50}SiMe_3$ was added to a amixture of toluene or xylene and aminoalcohol(s) and/or alcohol(s), at a temperature of 80° ± 10°C. The time of addition was two hours, during which time hydrogen was evolved. Thereafter, the reaction mixture was heated under reflux for a further 1 hour. In some cases tetramethylammonium hydroxide was added as a catalyst to accelerate the reaction. The products obtained were 50% solutions of aminoalkoxypolysiloxanes or alkoxypolysiloxanes. The components used were as follows:

Solution A 100 parts of methylpolysiloxane, 100 parts of aminoethanol and 200 parts of toluene.

Solution B 63.2 parts of methyl polysiloxane, 48.8 parts of aminoethanol, 16.0 parts of 2-methoxyethanol, 125.2 parts of toluene and 0.04 parts of tetramethylammonium hydroxide.

Solution C 120 parts of methylpolysiloxane, 17 parts of aminoethanol, 55 parts of methanol, 188 parts of toluene and 0.06 parts of tetramethylammonium hydroxide.

Solution D 70.4 parts of methylpolysiloxane, 104 parts of dimethylaminoethanol, 172.4 parts of toluene and 0.03 parts of tetramethylammonium hydroxide.

Solution E 63.2 parts of methylpolysiloxane, 44.5 parts of dimethylaminoethanol, 18 parts of methanol, 121.7 parts of toluene and 0.04 part of tetramethylammonium hydroxide.

Solution F 63.2 parts of methylpolysiloxane, 12.4 parts of dimethylaminoethanol, 41.0 parts of ethanol, 112.7 parts of toluene and 0.03 part tetramethylammonium hydroxide.

Solution G 63.0 parts of methylpolysiloxane, 30.5 parts of aminoethanol, 22.5 parts of dimethylaminoethanol, 22.5 parts of 2-ethoxy ethanol and 136.0 parts of xylene.

Solution H 50.0 parts of methypolysiloxane, 22.5 parts of N-methylaminoethanol, 34.2 parts of 2-methoxy ethanol, 1.6 parts of methanol and 108.3 parts of xylene.

Solution I 50.0 parts of methylpolysiloxane, 36.25 parts of 2-amino-1-butanol, 30.15 parts of n-butanol and 116.4 parts of xylene.

Solution J 25.0 parts of methylpolysiloxane, 30.4 parts of 2-methoxy ethanol, 54.4 parts of toluene and 0.05 part of tetramethylammonium hydroxide.

Solution K 30.0 parts of methylpolysiloxane, 23.0 parts of ethanol, 52.1 parts of toluene and 0.05 part of tetramethylammonium hydroxide.

Solution L 63.2 parts of methylpolysiloxane, 44.4 parts of n-butanol, 18.4 parts of ethanol, 124.0 parts of toluene and 0.04 part of tetramethylammonium hydroxide.

Solution M 41.2 parts of a polysiloxane of formula $Me_3SiO(Me_2SiO)_{34}(MeHSiO)_{24}SiMe_3$ were added to a mixture of 55.3 parts of xylene and 14.6 parts of aminoethanol and reaction carried out at a temperature of 110°–120°C. The time of addition was one hour during which time hydrogen was evolved. Thereafter, 0.9 part of n-butanol was added and the reaction mixture heated under reflux for a further 1 hour. The product obtained was a 50% solution of aminoalkoxypolysiloxane.

Six coating solutions were prepared, each sonsisting of 100 parts of a linear hydroxyl-ended dimethylpolysiloxane of viscosity $10^7$cs. at 25°C, 5 parts of a linear trimethylsilyl-ended methylhydrogenpolysiloxane of viscosity 20 cs. at 25°C and of Me:Si ratio of 1.08 to 1, 8 parts of dibutyltin diacetate and 2 parts of acetic acid in 1200 parts of toluene. To each of these solutions there was added 1.0 part of one of the aminoalkoxysiloxane solutions A to F described above.

These solutions were then coated onto vegetable parchment paper to give silicone coatings of about 0.8 g/sq.metre, and the coatings cured in a forced draught air oven at 120°C for 20 seconds. The cured silicone films were then immediately coated with a solvent solution of an aggressive pressure sensitive adhesive, again placed in an air oven to remove the adhesive solvent, and finally label paper was applied to the solvent-free adhesive surface to complete the laminate. Samples of each laminate were stored under a pressure of 1 p.s.i. for 20 hours, then the force required to separate an inch wide strip was measured. The separated adhesive coated paper strips were applied to a clean "Melinex" film surface, rolled 12 times with a 30 lb. roller and the release force, called "subsequent adhesion" measured. The observed results are given in Table 1.

Table 1

| Aminoalkoxy compound | Peel force (g./inch) | Subsequent release (g/inch) |
| --- | --- | --- |
| A | 69 | 1800 |
| B | 42 | 1850 |
| C | 80 | 1950 |
| D | 101 | 1900 |
| E | 81 | 2000 |
| F | 110 | 1950 |

The adhesive used was an aggressive SBR adhesive having a normal peel strength of 1900–2000 g/inch.

EXAMPLE 2

Six coating solutions were prepared each consisting of 100 parts of the hydroxyl-ended dimethylpolysiloxane used in Example 1, 6 parts of the methylhydrogenpolysiloxane used in Example 1, 8 parts of 1,3-diacetyl-1,1,3,3-tetrabutyldistannoxane and 2 parts of acetic acid in 1200 parts of toluene. To each of these solutions was added 1.0 part of one of the aminoalkoxysiloxane solutions of Example 1. The solutions thus obtained were coated, cured and laminated as described in Example 1. The results obtained are given in Table 2.

Table 2

| Aminoalkoxy compound | Peel force (g/inch.) | Subsequent adhesion (g/inch) |
| --- | --- | --- |
| A | 90 | 1800 |
| B | 90 | 1920 |
| C | 92 | 1900 |
| D | 97 | 2000 |
| E | 98 | 2000 |
| F | 110 | 1950 |

EXAMPLE 3

Ten coating solutions were prepared each consisting of 100 parts of the hydroxyl-ended dimethylpolysiloxane used in Example 1, 6 parts of the methylhydrogenpolysiloxane used in Example 1, and 1.0 part of aminoalkoxysiloxane solution B of Example 1 in 1200 parts of toluene. To each of these solutions was added an organotin catalyst as indicated below. The solutions thus obtained were coated, cured and laminated as described in Example 1. The results are given in Table 3.

Table 3

| Organotin catalyst | Parts of catalyst | Peel force (g./inch) |
| --- | --- | --- |
| Tetrabutylbis(methylethylketoximo)distannoxane | 8 | 265 |
| Tetrabutylbis(butyraldoximo)distannoxane | 8 | 77 |
| Tetrabutylbis(benzaldoximo)distannoxane | 8 | 128 |
| Dibutylbis(benzaldoximo)tin | 8 | 157 |
| Dibutyltin dilaurate | 8 | 178 |
| Dibutyltin di(2-ethylhexoate) | 8 | 122 |
| Dibutyltin di(2-ethylhexoate) | 12 | 107 |
| Dioctyltin diacetate | 8 | 47 |
| Dioctyltin diacetate | 10.5 | 74 |
| Dibutyltin diethoxide | 4 | 100 |

EXAMPLE 4

This example shows the effect on release of varying the aminoalkoxysiloxane concentration.

Four coating solutions were prepared each consisting of 100 parts of the hydroxyl-ended dimethylpolysiloxane used in Example 1, 6 parts of the methylhydrogenpolysiloxane used in Example 1, 8 parts of dibutyltin diacetate and 2 parts of acetic acid in 1200 parts of toluene. To these solutions was added 10.0, 2.0, 1.0 and 0.2 parts respectively of aminoalkoxysiloxane solution E described in Example 1. The solutions thus obtained were coated, cured and laminated as described in Example 1. The release results so obtained are given below:

| Parts of aminoalkoxysiloxane compound used | Peel Force (g/inch) |
| --- | --- |
| 5.0 | 117 |
| 1.0 | 92 |
| 0.5 | 81 |
| 0.1 | 101 |

EXAMPLE 5

This example again shows the effect on release of varying the amine concentration.

Four coating solutions were prepared as in Example 4 except that the aminoalkoxysiloxane solution B of Example 1 was used. After coating, curing and laminating as described in Example 1, the following results were obtained.

| Parts of aminoalkoxysiloxane compound used | Peel Force (g./inch) |
| --- | --- |
| 5.0 | 127 |
| 1.0 | 55 |
| 0.5 | 42 |
| 0.1 | 101 |

EXAMPLE 6

This example further illustrates the effect on release of varying the aminoalkoxysiloxane concentration.

Four coating solutions were prepared as in Example 4, except there were used 2.0, 1.0, 0.2 and 0.1 parts respectively of the aminoalkoxysiloxane solution A of Example 1. After coating, curing and laminating as described in Example 1 they gave the following results.

| Parts of aminoalkoxysiloxane used | Peel force (g./inch) |
| --- | --- |
| 1.0 | 85 |
| 0.5 | 69 |
| 0.1 | 81 |
| 0.05 | 86 |

EXAMPLE 7

Two coating solutions were prepared as in Example 4, except that there were used 2.0 and 1.0 parts of the aminoalkoxysiloxane solution M of Example 1. After coating, curing and laminating as described in Example 1 they gave the following results.

| Parts of aminoalkoxysiloxane compound used | Peel force (g./inc.) |
| --- | --- |
| 1.0 | 112 |
| 0.5 | 82 |

EXAMPLE 8

Four coating solutions were prepared each consisting of 100 parts of the hydroxyl-ended dimethylpolysiloxane used in Example 1, 6 parts of the methylhydrogenpolysiloxane used in Example 1, and 1.0 part of aminoalkoxysiloxane solution C described in Example 1. To these solutions was added 8, 6, 4 and 2 parts respectively of dibutyltin diacetate as catalyst. The solutions thus obtained were coated, cured and laminated as described in Example 1. The release results so obtained are given below.

| Parts of organotin catalyst | Peel force (g./inch) |
| --- | --- |
| 8 | 55 |
| 6 | 56 |
| 4 | 55 |
| 2 | 111 |

EXAMPLE 9

Five coating solutions were prepared each consisting of 100 parts of hydroxyl-ended dimethylpolysiloxanes of viscosities as indicated below, 4 parts of the methylhydrogenpolysiloxane used in Example 1, 8 parts of dibutyltin diacetate, 2 parts of acetic acid, 0.4 part of aminoalkoxysiloxane solution G described in Example 1, and amounts of toluene as shown. The solutions thus obtained were coated, cured and laminated as described in Example 1. The release results so obtained are given below:

| Hydroxyl-ended dimethylpolysiloxane Viscosity (cs) at 25°C | Parts toluene | Peel Force (g./inch) |
| --- | --- | --- |
| $57 \times 10^6$ | 1200 | 41 |
| $29 \times 10^6$ | 1200 | 67 |
| $0.93 \times 10^6$ | 1200 | 79 |
| 96,800 | 400 | 44 |
| 4,500 | 200 | 29 |

EXAMPLE 10

This example illustrates the effect on release of varying the concentration of methylhydrogenpolysiloxane.

Five coating solutions were prepared each consisting of 100 parts of the hydroxyl-ended dimethylpolysiloxane used in Example 1, 4 parts of the dibutyltin diacetate, 1 part of acetic acid, 1.0 part of aminoalkoxysiloxane solution I described in Example 1, and 1200 parts of toluene. There were added to these solutions 3, 5, 10, 15 and 20 parts respectively of the methylhydrogen polysiloxane used in Example 1. The solutions thus obtained were coated, cured and laminated as described in Example 1. The release results so obtained are given below:

| Parts of methylhydrogen polysiloxane | Peel force (g./inch) |
| --- | --- |
| 3 | 46 |
| 5 | 74 |
| 10 | 88 |
| 15 | 140 |
| 20 | 190 |

EXAMPLE 11

This example illustrates the use of other organohydrogen polysiloxane compounds in the invention.

Two coating solutions were prepared each consisting of 100 parts of the hydroxyl-ended dimethylpolysiloxane used in Example 1, 8 parts of dibutyltin diacetate, 2 parts of acetic acid, 1.0 parts of aminoalkoxysiloxane solution H described in Example 1, and 1200 parts of toluene. To each of these solutions was added a methyl hydrogenpolysiloxane of the kind and in amount as indicated below. The solutions thus obtained were coated, cured and laminated as described in Example 1. The release results so obtained are given below.

| Methylhydrogenpolysiloxane compound | Parts | Peel force (g/inch) |
| --- | --- | --- |
| $Me_3SiO(Me_2SiO)_{23}(MeHSiO)_{25}SiMe_3$ | 12 | 53 |
| $Me_3SiO(Me_2SiO)_{34}(MeHSiO)_{24}SiMe_3$ | 12 | 140 |

EXAMPLE 12

This example illustrates the advantage obtained by additionally having present a non-amino-containing alkoxysiloxane.

Six solutions were prepared each containing 100 parts of the hydroxyl-ended dimethylpolysiloxane used in Example 1, 6 parts of methylhydrogen polysiloxane used in Example 1, 8 parts of dibutyltin diacetate, 2 parts of acetic acid, 0.2 part of the aminoalkoxysiloxane solution A of Example 1 and 1200 parts of toluene. Additionally, to five of the solutions were added alkoxypolysiloxanes of the kind and in amount as indicated below. The solutions thus obtained were coated, cured and laminated as described in Example 1. The release results so obtained are given below:

| Alkoxypolysiloxanes solutions | Parts of alkoxypolysiloxane used | Peel force (g./inch) |
|---|---|---|
| — | 0 | 81 |
| J | 0.5 | 50 |
| K | 0.5 | 62 |
| K | 5 | 60 |
| L | 1 | 47 |
| L | 10 | 45 |

We claim:

1. A composition for use in surface treatment consisting essentially of 100 parts by weight of a diorganopolysiloxane having at least two hydroxyl groups attached to different silicon atoms per molecule and of viscosity not less than 3000 cs at 25°C, 1 to 20 parts by weight of an organohydrogenpolysiloxane of viscosity not greater than 1000 cs at 25°C and containing at least one silicon-bonded hydrogen atom for every three silicon atoms, 0.05 to less than 1 parts by weight of an aminoalkoxysilicon compound, 0.5 to 10 parts by weight of an alkoxy silicon compund of the formula:
$R_g^{11}(R^{12}O)_f SiO$
wherein $R^{11}$ is a methyl group, $R^{12}$ is selected from the group consisting of methyl, ethyl and methoxyethyl groups, $g$ is 1.0 to 1.8, $f$ is 0.3 to 1.0 and $g+f$ is not less than 2.0 and 1 to 20 parts by weight of a tin compound in an organic solvent.

2. A composition according to claim 1 wherein the viscosity of the diorganopolysiloxane is not less than 500,000 cs at 25°C.

3. A composition according to claim 1 wherein the organo groups in the diorganopolysiloxane are selected from the group consisting of alkyl, aryl, aralkyl, alkaryl, alkenyl, cycloalkyl and cycloalkenyl groups with or without halogen or cyano substituents.

4. A composition according to claim 1 wherein the organohydrogenpolysiloxane is used in amount not less than 3 parts by weight.

5. A composition according to claim 1 wherein the organo group in the organohydrogenpolysiloxanes are selected from the group consisting of alkyl, aryl, aralkyl, alkaryl, alkenyl, cycloalkyl and cycloalkenyl groups.

6. A composition according to claim 1 wherein the organohydrogenpolysiloxane consists of methylhydrogensiloxanyl units terminated by trimethylsilyl groups.

7. A composition according to claim 1 wherein the aminoalkoxysilicon is a silicon compound having one or more of the groups $(R^4R^5N.R^8—)$ attached to one or more silicon atoms through an oxygen atom, where $R^8$ is an alkylene group or consists of alkylene groups joined by one or more $—NR^6—$ groups or oxygen atoms and the oxygen atom attached to silicon and the essential nitrogen atom being attached to different carbon atoms and $R^4$ and $R^5$, which may or may not be the same, are hydrogen or alkyl, cycloalkyl, aminoalkyl or hydroxy-alkyl groups, monovalent groups consisting of alkylene and alkyl groups joined by one or more $—NR^5—$ groups or oxygen atoms or alternatively $R^4$ and $R^5$ together form a single alkylene group or a group consisting of alkylene groups joined by one or more $—NR^6—$ groups or oxygen atoms and $R^6$ is hydrogen or an alkyl group having not more than 5 carbon atoms.

8. A composition according to claim 7 wherein $R^8$ is selected from the group consisting of $—CH_2CH_2—$ and $—CH_2CH(Et)—$ and $R^4$ and $R^5$ are selected from the group consisting of hydrogen, methyl, and ethyl groups.

9. A composition according to claim 7 wherein the group $(R^4R^5NR^8—)$ is $NH_2.CH_2CH_2—$.

10. A composition according to claim 7 wherein the aminoalkoxy silicon compound is of the average general formula
$R^7{}_a(R^4R^5NR^8O)_b SiO$
where $R^7$ is selected from the group consisting of hydrocarbyl and hydrocarbyloxy groups, $a$ is any number from 0 to 2, $b$ is any number from 0.1 to 4, $a+b$ is not greater than 4 and not less than 1.95 and the total number of carbon atoms in the groups $R^8$, $R^4$, $R^5$ and $R^7$ is not greater than 24.

11. A composition according to claim 10 wherein $a$ is 1.0 to 1.8 $b$ is 0.3 to 1.0 and $a+b$ is not less than 2.

12. A composition according to claim 1 wherein the tin compound is used in amount from 1 to 10 parts by weight.

13. A composition according to claim 1 wherein the tin compound is an organotin acylate of the general formula

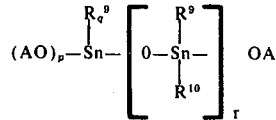

where A is an acyl group, $R^9$ and $R^{10}$, which may or may not be alike, are hydrocarbyl groups, preferably alkyl groups, $p$ is 1 or 2, $q$ is 1 or 2, $p+q$ equals 3 and $r$ is 0, 1 or 2.

14. A composition according to claim 13 wherein $R^9$ and $R^{10}$ are selected from the group consisting of butyl and octyl groups.

15. A composition according to claim 1 wherein the tin compound is of the general formula
$YO(R_2SnO)_n Y$
where R is an alkyl group having not more than 20 carbon atoms, Y is $R^1R^2C=N—$ or $R^3$ where $R^1$ is hydrogen or a hydrocarbyl group and $R^2$ and $R^3$ are hydrocarbyl groups and $n$ is 1, 2, 3 or 4.

16. A composition according to claim 15 wherein the group R is selected from the group consisting of butyl and octyl groups.

17. A composition according to claim 15 wherein the group $R^1$ is hydrogen and the group $R^3$ is selected from the group consisting of butyl and phenyl groups.

18. A surface of paper, polyolefin or polyester film, metals, glass or ceramics coated with a film obtained by curing a composition as claimed in claim 1.

* * * * *

UNITED STATES PATENT OFFICE
CERTIFICATE OF CORRECTION

Patent No. 3,941,856    Dated March 2, 1976

Inventor(s) Norman Geoffrey CREASEY and Leslie Clark PIKE

It is certified that error appears in the above-identified patent and that said Letters Patent are hereby corrected as shown below:

Column 5, line 3,   ) the formula should read:
Column 11, line 34, ) $-- R^{11}_g (R^{12}O)_f SiO_{\frac{4-g-f}{2}} --$ Signed and Sealed this Twenty-second Day of February 1977

[SEAL]

Attest:

RUTH C. MASON
Attesting Officer

C. MARSHALL DANN
Commissioner of Patents and Trademarks